United States Patent [19]
Betts et al.

[11] Patent Number: 5,008,903
[45] Date of Patent: Apr. 16, 1991

[54] ADAPTIVE TRANSMIT PRE-EMPHASIS FOR DIGITAL MODEM COMPUTED FROM NOISE SPECTRUM

[75] Inventors: William L. Betts, St. Petersburg; James J. DesRosiers, Tampa, both of Fla.

[73] Assignee: A.T. & T. Paradyne, Largo, Fla.

[21] Appl. No.: 357,056

[22] Filed: May 25, 1989

[51] Int. Cl.$^5$ ............................................. H04L 7/00
[52] U.S. Cl. ......................................... 375/60; 375/14
[58] Field of Search ................. 375/7, 8, 12, 13, 14, 375/15, 60, 109; 333/18, 28 R; 364/724; 371/64, 34; 455/24

[56] References Cited

U.S. PATENT DOCUMENTS

| | | | |
|---|---|---|---|
| 3,593,142 | 7/1971 | Freeny | 375/43 |
| 4,053,837 | 10/1977 | Ryan et al. | 375/15 |
| 4,433,425 | 2/1984 | de Jaeger | 375/13 |
| 4,483,009 | 11/1984 | Honda et al. | 375/14 |
| 4,489,416 | 12/1984 | Stuart | 375/13 |
| 4,550,415 | 10/1985 | Debus, Jr. et al. | 375/14 |
| 4,797,898 | 1/1989 | Martinez | 375/12 |

Primary Examiner—Douglas W. Olms
Assistant Examiner—Stephen Chin
Attorney, Agent, or Firm—Kane, Dalsimer, Sullivan, Kurucz, Levy, Eisele & Richard

[57] ABSTRACT

An apparatus and method calculates pre-emphasis coefficients for a transmitting modem based upon the noise spectrum as it is received at the receiving modem. A noise spectrum analysis circuit calculates a difference between the best-fit transmitted data and the actually received data. This difference is used to compute a discrete Fourier transform of the noise spectrum, which is transmitted back to the transmitting modem on the secondary channel. This data is used to calculate filter coefficients for the transmitting modem.

21 Claims, 4 Drawing Sheets

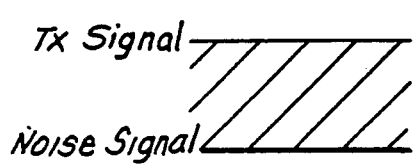
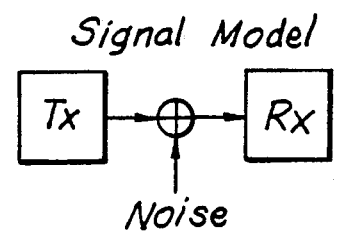
FIG.1a  FIG.1b  FIG.1c
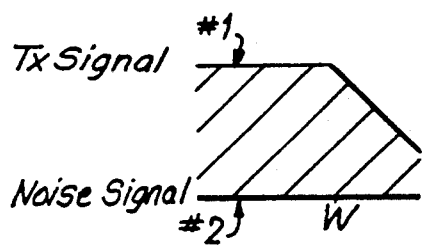
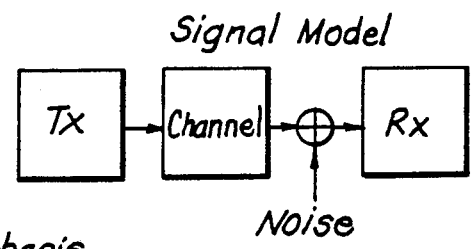
FIG.2a  FIG.2b  FIG.2c
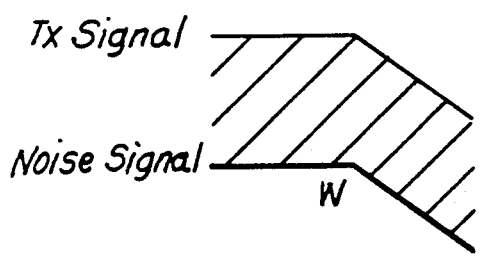
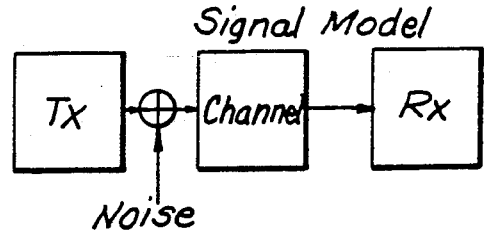
FIG.3a  FIG.3b  FIG.3c

ADAPTIVE TRANSMIT PRE-EMPHASIS FOR DIGITAL MODEM COMPUTED FROM NOISE SPECTRUM

BACKGROUND OF INVENTION

1. Field of Invention

This invention relates to an apparatus for determining a frequency-dependent signal-to-noise ratio in a communications network so as to allow proper equalization in a transmit pre-emphasis mode.

2. Description of the Prior Art

It is well-known in the prior art that a transmitter in a communications network, particularly a multipoint network, should emphasize or amplify certain frequencies so as to compensate for frequency-dependent losses in the communications process. For example, with the use of a telephone line as a communications line, losses are more pronounced at higher frequencies. These losses are typically modelled as a constant negative slope above a given break frequency on a decibels versus frequency plot.

When noise is injected into a communications line subsequent to the high-frequency roll-off of the communications line and the signal rolls off above a break frequency while the noise signal remains constant (thereby resulting in a signal-to-noise ratio which progressively decreases above the break frequency), prior art methods of frequency-dependent analysis of total energy received is adequate as an equalization technique. These methods include fixed pre-emphasis wherein a fixed frequency-dependent boost is included in the communication apparatus, or adaptive pre-emphasis wherein the required frequency-dependent boost is calculated on-line during a periodic training sequence.

However, when noise is injected into a communications line prior to the high frequency roll-off of the communications line and the noise rolls off in parallel to the roll-off of the signals (resulting in a constant signal-to-noise ratio as a function of frequency), prior art methods of frequency-dependent analysis of total energy received are inadequate as an equalization technique.

This inadequacy is due to the fact that a positive gain is applied to higher frequency portions of the total signal. However, in order to keep the total signal energy constant as is required by telephone and other communications line applications, this positive gain in the upper frequency spectrum must be compensated for by a negative gain in the lower frequency spectrum thereby reducing the signal-to-noise ratio in the lower frequencies and resulting in a degradation in performance. This principle is illustrated in more detail by the several drawings of FIGS. 1, 2 and 3.

FIG. 1a illustrates the received transmitter signal and the received noise signal being "flat" across the entire band. The signal model for this spectrum is shown in FIG. 1b wherein the communications line includes no roll-off or other frequency-dependent characteristics and noise is added between the transmitter and the receiver. Such a system requires no frequency-dependent pre-emphasis as is shown by the ideal flat pre-emphasis of FIG. 1c.

FIG. 2a illustrates the received transmitter signal rolling off above a break frequency $w_o$ while the received noise spectrum is "flat" across the entire band. The signal included for this spectrum is shown in FIG. 2b wherein the transmitter signal passes through a channel or communications line thereby being rolled-off before having frequency-independent noise added thereto. The ideal pre-emphasis, whether manually set or periodically calculated on-line, is illustrated in FIG. 2c wherein an increasing gain is applied above the frequency $w_o$. This frequency-dependent pre-emphasis flattens the transmitter signal as received without affecting the noise signal, thereby increasing the signal-to-noise ratio at the frequencies above $w_o$ and improving overall system performance. A slight negative gain may be applied in the lower frequencies so as to keep the total incoming energy constant. This ideal pre-emphasis is accurately calculated by prior art methods.

FIG. 3a illustrates the received transmitter signal and the received noise both rolling off in parallel above break frequency $w_o$. The signal model for this spectrum is shown in FIG. 3c wherein the noise is added to the transmitter signal at the transmitter end and both the transmitter signal and the noise are passed through the channels or communication line thereby having substantially identical attenuation characteristics applied thereto. Therefore, the signal-to-noise ratio remains constant throughout the entire band as is illustrated by the constant vertical distance between the received transmitter signal and the noise. As the signal-to-noise ratio is constant, the ideal signal pre-emphasis is flat or shown in FIG. 3c (or 1c). However, prior art methods of pre-emphasis, either manual or automated, would look to the frequency-dependent energy spectrum of the entire received signal (received transmitter signal plus received noise) and calculate a pre-emphasis similar to that shown in FIG. 2c. This would result in a lowering of the transmitter signal power and the signal-to-noise ratio at frequencies below break frequency $w_o$ and an overall degradation in system performance.

OBJECTS AND SUMMARY OF THE INVENTION

It is therefore the object of this invention to provide a method and apparatus for automated transmit pre-emphasis calculation which properly accounts for frequency-dependent signal-to-noise ratios.

This apparatus and method uses a noise spectrum generator circuit to calculate a frequency-dependent noise spectrum. This spectrum is transmitted from the receiver to the transmitter (or from the master to the remote in a multipoint system) via the secondary channel. The transmitter uses this information to compute the new pre-emphasis coefficients from its own transmitted spectrum as seen by the receiver and uses the result on its subsequent transmission.

Thus, this and other objects are effectively achieved.

BRIEF DESCRIPTION OF THE DRAWINGS

FIGS. 1a, 1b and 1c are illustrative of a communications system with no frequency-dependent attenuation or roll-off.

FIGS. 2a, 2b and 2c are illustrative of a communications system with noise injected subsequent to frequency-dependent attenuation or roll-off.

FIGS. 3a, 3b and 3c are illustrative of a communications system with noise injected prior to frequency-dependent attenuation or roll-off.

DETAILED DESCRIPTION OF THE PREFERRED EMBODIMENT

Figure 4:
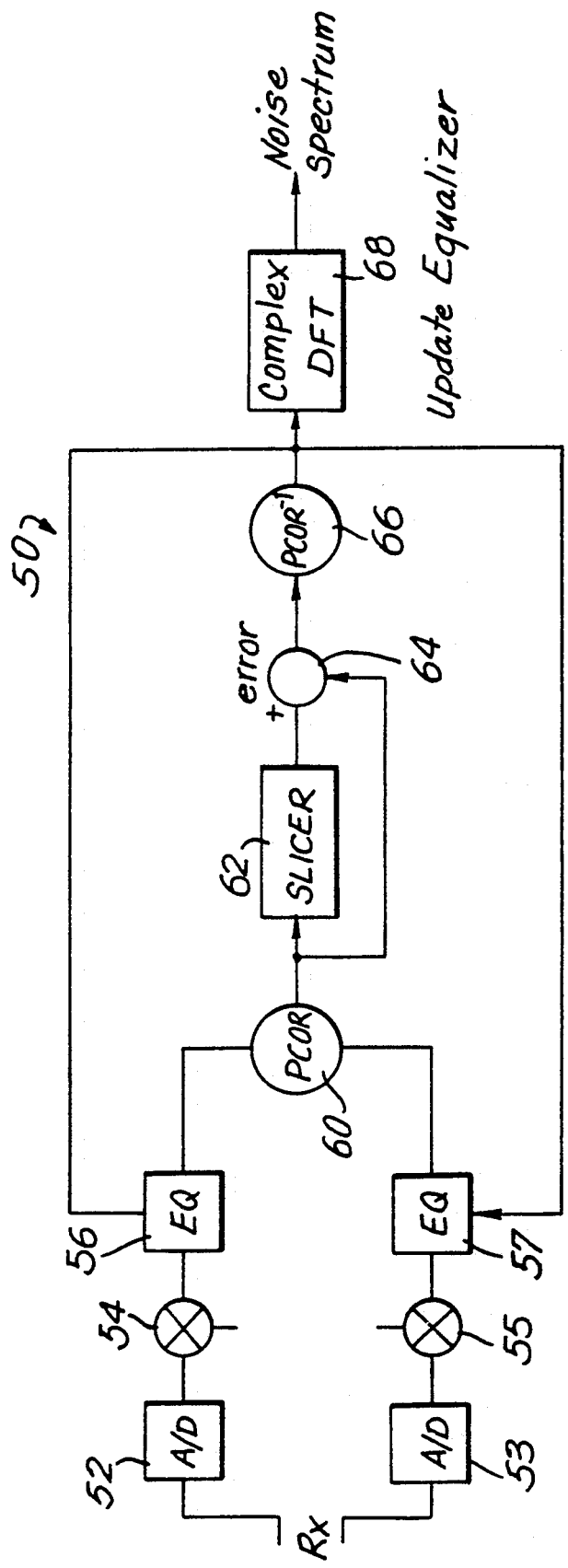
FIG. 4 is a schematic of the noise spectrum generator circuit of the present invention.

Referring now to the drawings in detail wherein like numerals indicate like elements throughout the several views, noise spectrum generator circuit 50 is illustrated in FIG. 4. As will be described herein, noise spectrum generator circuit 50 is incorporated into the circuitry of the modem receiver circuit 12 of FIG. 5.

Noise spectrum generator circuit 50 includes analog-to-digital converters 52, 53 and sinusoidal mixers 54, 55 for demodulation. The demodulated signal from mixers 54, 55 is equalized by linear equalizers 56, 57. Linear equalizers 56, 57 are transversal filters which are from the prior art and are not to be confused with the equalization used for pre-emphasis in the transmitter circuitry. The resulting signals are phase corrected by phase corrector 60 which results in an x-y signal representative of the complex plane to slicer 62. Slicer 62 includes the constellation or eye pattern data which is used in the quadrature amplitude modulation scheme of the signal received by analog-to-digital convertors 52, 53. Slicer 62 outputs the constellation point which is closest to the input of slicer 62. Therefore, the actual received point is input to slicer 62 and the presumed actual transmitted point is output from slicer 62. Comparator 64 subtracts the actual received point from the actual transmitted point so as to calculate an error signal which is representative of the noise signal at the given frequency. This error or noise signal is inversely related to the distance between the signal line and the noise line of FIGS. 1a, 2a and 3a at the given frequency.

The resulting error signal is phase corrected by inverse phase corrector 66. The output of inverse phase corrector 66 is used to update the characteristics of linear equalizers 56, 57 and as an input to complex DFT (discrete Fourier transform) block 68. Complex DFT block 68 converts the phase corrected noise signals in the time domain (i.e. successive values corresponding to successive frequencies) into the noise spectrum in the frequency domain.

Figure 5:
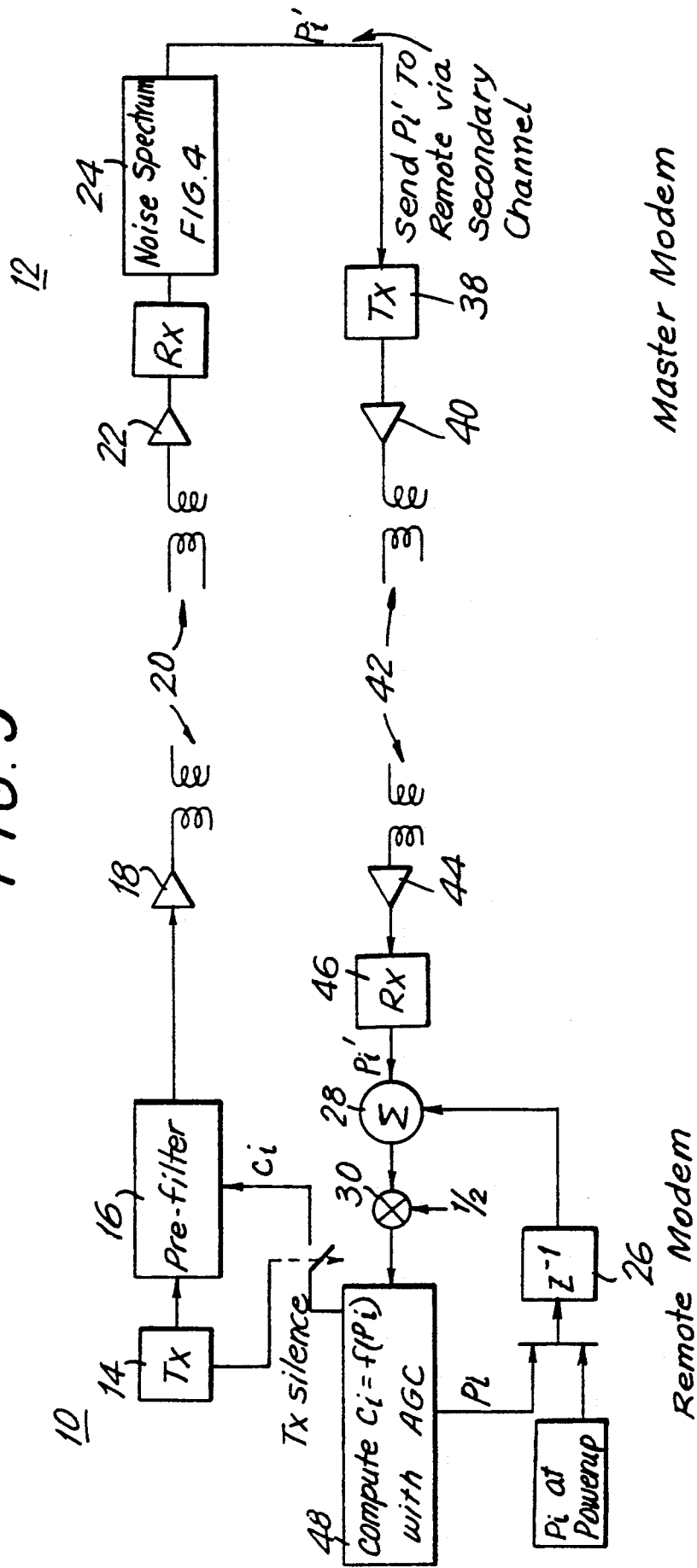
FIG. 5 is a schematic of the transmitter and receiver of the present invention.

FIG. 5 discloses the entire modem transmitter circuit 10 and modem receiver circuit 12 of the present invention. Modem transmitter circuit 10 includes a conventional modem transmitter 14 which outputs digital signals to be transmitted to pre-filter 16. Pre-filter 16 pre-emphasizes the digital signals prior to their conversion to analog signals. Pre-filter 16, as will be described herein, includes nine-tap filter 70 as shown in FIG. 7. The output of the pre-filter 16 is converted to analog format by digital-to-analog converter 18 for transmission across communications line 20, which may be a telephone line, to modem receiver circuit 12.

Analog-to-digital converter 22 (which corresponds to analog-to-digital converters 42, 43 of FIG. 4) converts the analog signal from communications line 20 into digital format for input into noise spectrum analysis block 24. The remainder of the noise spectrum generator circuit of FIG. 4 is included in noise spectrum analysis block 24 from which a frequency domain plot of the noise signal ($P'_i$, i=1,5) is output, said frequency domain plot being derived by discrete Fourier transform techniques as previously described.

Secondary channel transmitter 38 transmits communications network control parameters, including the spectrum ($P_i$, i=1,5) from block 24, on a sideband of the primary channel at a low transmission rate through line 42 via digital-to-analog converter 40 to analog-to-digital converter 44 of modem transmitter circuitry 10.

Modem transmitter circuitry 10 includes analog-to-digital converter 44 and secondary channel receiver 46 which receives the spectrum sent from secondary channel transmitter 38 through line 42. Secondary channel receiver 46 transmits the spectrum ($P'_i$, i=1,5) data to comparator 28. In order to account for existing pre-emphasis, the frequency domain plot of the noise signal has subtracted from it the previous frequency domain plot as stored in shift register 26. This subtraction is performed by comparator 28. The reference spectrum outputs from comparator 28 is multiplied by one half by multiplier 30. This division is done as the current state-of-the-art is to have the transmitter provide by pre-emphasis one half of the signal compensation required while the receiver provides the other half. The portion provided by the receiver of, course, is done by apparatus separate from the invention as herein described. This division by two is optional and not crucial to the invention. The reference spectrum may be divided by other values, or not divided at all, in other embodiments of the invention.

Shift register 26 includes a power-up line which initializes the contents of shift register 26 with values representative of a flat spectrum as stored in block 29.

The output of multiplier 30 is input to compute block 48 which calculates and transmits the pre-filter coefficients ($C_i$, i=0,4) for pre-filter 16 as will be described hereinafter.

Figure 6:
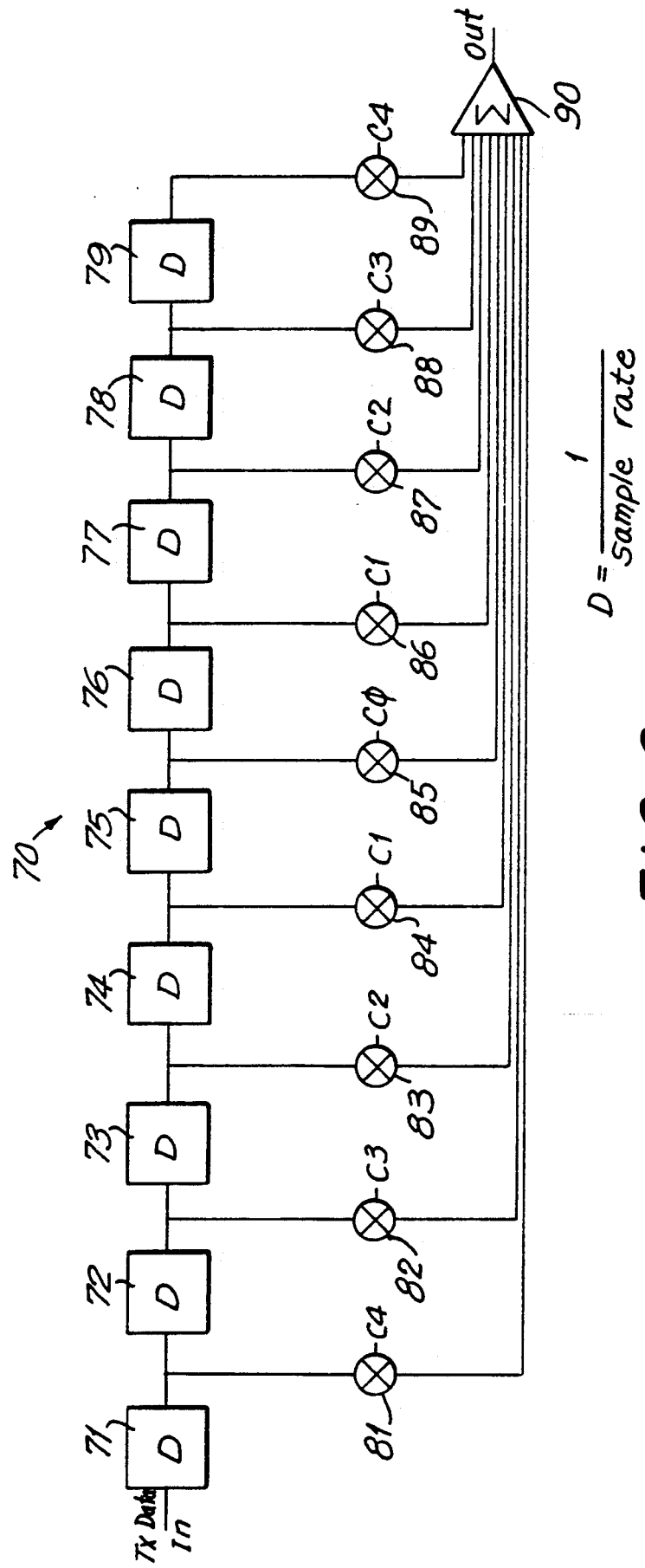
FIG. 6 is a schematic of the nine-tap filter of the pre-filter of FIG. 5.

Pre-filter 16 includes nine-tap filter 70 as shown in FIG. 6. Nine-tap filter 70 receives its input from the output from modem transmitter 14. The input is transmitted through a series of 9 delay blocks 71–79, the outputs of each of these delay blocks is sent through multipliers 81–89. Multipliers 81–89 receive their second multiplicands ($C_0$–$C_4$) from compute block 48 and send their respective products to adder 90. The output of adder 90 is the output of pre-filter 16.

Compute block 48 includes a power-up line which initializes the pre-filter coefficients ($C_i$, i=0,4) for a flat spectrum for the first transmission of the transmitting circuit 10. Subsequent initialization could be provided by the previously calculated $C_i$, i=0,4 stored in nonvolatile memory.

The functional description of this invention is as follows.

The transmitting modem 10 sends QAM modulated data signals to the receiving modem 12.

The noise spectrum generator circuit 50, including the complex DFT block 68, calculates a frequency spectrum ($P_i$, i=1,5) of the noise at 5 frequencies—709, 1145, 1800, 2455 and 2891 Hertz. These frequencies are chosen from a 22 point discrete Fourier transform calculation so as to span the usable frequency of a telephone line. The spectrum is transmitted back to the transmitting modem 10 over the secondary channel. The previous frequency spectrum is subtracted from the new frequency spectrum, and the result is divided in half. This result is stored as the "previous value" for the next calculation.

The frequency spectrum ($P_i$, i=1,4) of the noise expressed in a logarithm scale are converted to a linear scale ($F_i$, i=0,4) in compute block 48.

The linear scale frequency spectrum is converted to filter coefficients through the following transformation:

$$C_0 = (F_0 - 2F_1 + 2F_2 - 2F_3 + F_4)/8$$
$$C_1 = (F_0 - 2F_1 + 2F_3 - F_4)/8$$
$$C_2 = (F_0 - 2F_2 + F_4)/8$$
$$C_3 = (F_0 + 2F_1 + 2F_3 - F_4)/8$$
$$C_4 = (F_0 + 2F_1 + 2F_2 + 2F_3 + F_4)/8$$

$C_i$, i=0,4, is then transformed by computer block 48 into $C'_i$, i=0,4 in order to adjust the pre-emphasis coefficients to be appropriate for the resonators of the resonating filters. These resonators are located at 0, 600, 1200 and 2400 Hertz. An iterative calculation is done to adjust the pre-emphasis coefficients, $C'_i$, i=0,4 (i.e. scalars) into appropriate filter coefficients, $C_i$, i=0,4.

Finally, these filter coefficients, $C_i$, i=0,4, are adjusted via an AGC circuit in compute block 48, so as to assure a constant power output from transmitting modem 10.

These appropriate filter coefficients $C_i$, i=0,4 are transmitted to pre-filter 16. However, pre-filter 16 implements these coefficients only whenever data is not being transmitted through pre-filter 16, such as just before a remote modem responds to a poll. This implementation precludes changing the transmission characteristics in the middle of a transmission.

Obviously, many modifications and variations of the invention are possible in light of the above description. It is therefore to be understood that within the scope of the appended claims, the invention may be practiced other than as specifically described.

What is claimed is:

1. An apparatus for calculating pre-emphasis coefficients for a transmitting modem in a communications system, including:
   first transmitting means in the transmitting modem, including adjusting means responsive to the pre-emphasis coefficients for adjusting frequency-dependent characteristics of an output of said first transmitting means;
   receiving means for receiving said output from said first transmitting means;
   generating means for generating parameters responsive to a noise spectrum of said output including means for calculating said noise spectrum of said output;
   second transmitting means for transmitting said parameters to the transmitting modem, and
   computing means for computing the pre-emphasis coefficients from said parameters.

2. The apparatus of claim 1 wherein said adjusting means includes a filter with several taps.

3. The apparatus of claim 2 wherein said filter includes at least nine taps.

4. The apparatus of claim 1 wherein said generating means includes a noise spectrum generator circuit.

5. The apparatus of claim 4 wherein said noise spectrum generator circuit includes:
   determining means for determining best-fit transmitted data points from said output of said first transmitting means as received by said receiving means;
   comparing means for determining a difference between said best-fit transmitted data points and said output as received by said receiving means thereby calculating said noise spectrum of said output.

6. An apparatus for calculating pre-emphasis coefficients for a transmitting modem in a communications systems, including:
   first transmitting means in the transmitting modem, including adjusting means responsive to the pre-emphasis coefficients for adjusting frequency-dependent characteristics of an output of said first transmitting means;
   receiving means for receiving said output from said first transmitting means;
   generating means, including a noise spectrum generator circuit, for generating parameters responsive to a noise spectrum of said output;
   second transmitting means for transmitting said parameters to the transmitting modem; and
   computing means for computing the pre-emphasis coefficients from said parameters;
   wherein said noise spectrum generator circuit includes determining means for determining best-fit transmitted data points from said output of said first transmitting means as received by said receiving means; and comparing means for determining a difference between said best-fit transmitted data points and said output as received by said receiving means;
   wherein said receiving means includes analog-to-digital conversion means and demodulating means which generates a complex signal; and wherein said noise spectrum generator circuit includes a phase corrector responsive to said complex signal; a slicer which determines, from said complex signal, best-fit transmitted data points from said first transmitting means; subtracting means for determining a difference between said best-fit transmitted data points and said complex signal; an inverse phase corrector responsive to said difference; and a complex discrete Fourier transform block responsive to said inverse phase corrector.

7. The apparatus of claim 6 wherein said phase corrector is responsive to equalization means and wherein said equalization means is responsive to said inverse phase corrector.

8. An apparatus for calculating pre-emphasis coefficients for a transmitting modem in a communications systems, including:
   first transmitting means in the transmitting modem, including adjusting means responsive to the pre-emphasis coefficients for adjusting frequency-dependent characteristics of an output of said first transmitting means;
   receiving means for receiving said output from said first transmitting means;
   generating means, including a noise spectrum generator circuit, for generating parameters responsive to a noise spectrum of said output;
   second transmitting means for transmitting said parameters to the transmitting modem; and
   computing means for computing the pre-emphasis coefficients from said parameters;
   wherein said noise spectrum generator circuit includes determining means for determining best-fit transmitted data points from said output of said first transmitting means as received by said receiving means; and comparing means for determining a difference between said best-fit transmitted data points and said output as received by said receiving means; and wherein said determining means includes eye pattern data.

9. An apparatus for calculating pre-emphasis coefficients for a transmitting modem in a communications systems, including:
- first transmitting means in the transmitting modem, including adjusting means responsive to the pre-emphasis coefficients for adjusting frequency-dependent characteristics of an output of said first transmitting means;
- receiving means for receiving said output from said first transmitting means;
- generating means, including a noise spectrum generator circuit, for generating parameters responsive to a noise spectrum of said output;
- second transmitting means for transmitting said parameters to the transmitting modem; and
- computing means for computing the pre-emphasis coefficients from said parameters;
- wherein said noise spectrum generator circuit includes determining means for determining best-fit transmitted data points from said output of said first transmitting means as received by said receiving means; and comparing means for determining a difference between said best-fit transmitted data points and said output as received by said receiving means; and
- wherein said generating means includes discrete Fourier transform means responsive to said difference, thereby calculating a frequency domain representation of said noise spectrum of said output.

10. The apparatus of claim 8 wherein said generating means further includes discrete Fourier transform means responsive to said difference, thereby calculating a frequency domain representation and storing the values of the frequency domain representation of a noise spectrum of said output.

11. The apparatus of claim 10, wherein said computing means includes subtracting means for subtracting previously stored values from said frequency domain representation thereby calculating second differences.

12. The apparatus of claim 11 wherein said computing means further includes dividing means for dividing said second differences.

13. The apparatus of claim 12 wherein said dividing means divides by two.

14. The apparatus of claim 11 wherein said second differences replace said previously stored values.

15. The apparatus of claim 1 wherein said second transmitting means transmits over a secondary channel.

16. The apparatus of claim 15 wherein said secondary channel is a sideband of a channel of said first transmitting means.

17. The apparatus of claim 16 wherein said receiving means and said second transmitting means are incorporated into a single circuit.

18. The apparatus of claim 1 wherein said computing means converts said parameters from logarithmic to linear scale.

19. The apparatus of claim 1 wherein said computing means adjusts said parameters iteratively to adjust for resonator frequencies of said first transmitting means.

20. The apparatus of claim 1 wherein said computing means adjusts said parameters to assure a constant power output of said first transmitting means.

21. A method for calculating pre-emphasis coefficients for a transmitting modem in a communications systems, including the steps of:
- transmitting from the transmitting modem;
- adjusting frequency characteristics of output from said transmitting step responsive to the pre-emphasis coefficients;
- receiving said output from said first transmitting means;
- calculating a noise spectrum of said output;
- generating parameters responsive to said noise spectrum of said output;
- sending said parameters to the transmitting modem; and
- computing the pre-emphasis coefficients from said parameters.

* * * * *